United States Patent [19]

Amirsakis

[11] 4,284,750

[45] Aug. 18, 1981

[54] POLYURETHANE RESINS

[75] Inventor: Charles J. Amirsakis, Lake Geneva, Wis.

[73] Assignee: Morton-Norwich Products, Inc., Chicago, Ill.

[21] Appl. No.: 161,495

[22] Filed: Jun. 20, 1980

[51] Int. Cl.³ .............................................. C08G 18/42
[52] U.S. Cl. ..................... 528/79; 360/134; 427/132; 428/425.9; 528/83
[58] Field of Search ................... 528/79, 83; 360/134; 427/132; 428/425.9

[56] References Cited

U.S. PATENT DOCUMENTS

| | | | |
|---|---|---|---|
| 2,871,218 | 1/1959 | Schollenberger | 260/32.6 R |
| 4,152,485 | 5/1979 | Miyumura et al. | 428/425.9 |
| 4,154,895 | 5/1979 | Ogawa et al. | 360/134 |

Primary Examiner—Maurice J. Welsh
Attorney, Agent, or Firm—Jack Axelrood

[57] ABSTRACT

Thermoplastic polyurethane compositions having excellent mechanical and thermal properties, high hardness and the capabilty of binding or adhering to magnetic pigments, formed by reacting 1,4-cyclohexanedimethanol with a dicarboxylic acid such as adipic, azelaic or 1,12-dodecanedioic acid, or mixtures thereof in a hydroxyl number range of from about 50 to about 250 to form a hydroxyl-terminated polyester, combining the polyester so formed with a chain extender to form a mixture in a hydroxyl number range of from about 130 to about 300 and reacting said mixture with a diisocyanate to form the polyurethane resin. Such polyurethanes display excellent binding properties for adhering magnetic iron oxide or other magnetic pigments to flexible substrates to form magnetic tape.

26 Claims, No Drawings

POLYURETHANE RESINS

BACKGROUND OF THE INVENTION

1. Field of the Invention

The field of the invention is generally that of polyurethane resins. More specifically, it is that of polyurethane resins specifically designed for use in the preparation of magnetic tapes suitable for use in audio, video and computer applications. A magnetic tape is produced essentially by adhering a coating of magnetic iron oxide to a suitable flexible substrate, preferably a polyester film.

The task of the resin employed in magnetic tapes is to hold and bind together the magnetic pigment, which is the fundamental material which permits a recording to be made.

Obviously, the more magnetic iron oxide which can be bonded to the substrate to form the tape the better. Of course, the binding agent must not impart any undesirable qualities to the finished tape.

2. Description of the Prior Art

The prior art is replete with teachings of the preparation of polyurethane resins made by reacting a diisocyanate with a polyester, where the polyester is formed from the reaction of a glycol with a dicarboxylic acid, with or without a chain extender. Thus, some U.S. prior art patents which have been located and which bear on this subject matter are the following: U.S. Pat. Nos. 2,871,218; 2,888,432; 2,983,702; 3,660,341; 3,357,954; 3,718,518; 3,753,953; 3,923,747; 3,929,732; 3,931,113; 4,000,117; 4,010,311; and 4,049,590.

However, none of said prior art patents teaches the preparation of a polyurethane resin which can function as an efficient binder of magnetic iron oxide to a flexible substrate, without the necessity of hardening or crosslinking agents, to produce a magnetic tape which exhibits the requisite properties of hardness, freedom from blocking, good mechanical properties and a high magnetic iron oxide holding power.

Current urethane resin products available to the magnetic tape industry have several disadvantages:

A. They must be compounded with non-urethane resin modifiers such as phenoxides, epoxies and vinyls in order to increase their hardness and reduce their elastomeric nature.

B. They must be crosslinked with polyfunctional isocyanates at substantially high levels (10–15% by weight based on the resin) to produce satisfactory coatings and overcome blocking problems encountered during the processing and storage of the magnetic tape.

The term "blocking" is virtually synonymous with "stickiness" and describes the condition in which a film or tape, when wound up into a roll, cannot be unwound because it has adhered to itself.

C. They do not have maximum magnetic pigment or magnetic iron oxide holding or binding power.

It would, therefore, be desirable to provide polyurethane resins which combine a unique set of properties in which (1) The mechanical properties have been balanced and the need of compounding with non-urethane modifiers has been eliminated.

(2) Essentially no crosslinking is required to produce totally satisfactory magnetic tape coatings. This is a definite improvement, since the crosslinking reaction is considered by the industry to be the most critical and difficult step to control during the production of magnetic tape.

(3) The blocking characteristics are satisfactory even when the polymer is used uncrosslinked.

(4) Superior magnetic pigment holding power is displayed.

SUMMARY OF THE INVENTION

The foregoing described desirable attributes of a polyurethane resin are provided by the polyurethane resins of the present invention which are characterized by excellent mechanical and thermal properties, hardness and the capability of binding or adhering to magnetic pigments, including magnetic iron oxide, said composition being essentially free of crosslinks and comprising the reaction product of:

(A) a hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having an hydroxyl number of from about 50 to about 250, (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di($\beta$-hydroxyethyl) ether, the resultant hydroxyl number of said polyester and chain extender together being from about 130 to about 300, and (C) an aliphatic or aromatic diisocyanate in an amount substantially equivalent to the molar quantity of (A) plus (B).

The ratio of 1,4-cyclohexanedimethanol to dicarboxylic acid is governed by the acceptable hydroxyl number range which is limited to about 50 to about 250 overall. However, where the polyester is formed from azelaic acid alone the hydroxyl range is from about 50 to about 235; in the instance of 1,12-dodecanedioic acid alone, the hydroxyl number is from 50 to about 216.

The preferred diisocyanate is methylene bis diphenyl diisocyanate, also known as diphenyl methane-p,p'-diisocyanate, hereinafter referred to as MDI. Other operable diisocyanates may be the aliphatic diisocyanates, such as tetramethylene diisocyanate, hexamethylene diisocyanate and the like; the cycloaliphatic diisocyanates, such as cyclohexyl diisocyanate and the like; the aromatic diisocyanates, such as the phenyl diisocyanates, the toluene diisocyanates and the like; the dicycloaliphatic diisocyanates, such as cyclohexyl methane diisocyanate and the like; and the diaryl diisocyanates, such as, MDI, dichloro-diphenyl methane diisocyanate, dimethyl diphenyl methane diisocyanate, diphenyl dimethyl methane diisocyanate, dibenzyl diisocyanate, diphenyl ether diisocyanate and the like The amount of diisocyanate used to react with the hydroxy-terminated polyester and chain extender depends on the quantity of polyester and free glycol, if any, present in the polyester composition. The number of moles of diisocyanate will be substantially equal to the sum total of the number of moles of polyester and chain extender (free glycol). The result is that the polyurethane resin formed is essentially free of NCO (isocyanate) groups.

The chain extender may be any glycol, or combinations of glycols, containing two hydroxyl groups, such as ethylene glycol, propylene glycol, 1,4-butanediol, 1,3-butanediol, 1,5-pentanediol, 1,6-hexanediol, 1,4-cyclohexanedimethanol, hydroquinone di($\beta$-hydroxyethyl) ether, or any aliphatic or aromatic molecule containing two reactive hydroxyl groups. The preferred chain extender is 1,4-butanediol.

The quantity of chain extender used is controlled by the hydroxyl number of the resultant polyester-chain extender combination, i.e., in the range of about 130 to about 300. The relationship between the hydroxyl number and equivalent weight is given by the following equation:

$$\text{Equivalent Weight} = \frac{56,100}{\text{Hydroxyl Number}}$$

It is seen that the molecular weight is twice that of the equivalent weight in the present instance where the functionality of the polyester is 2.

The polyester portion of the preparation of the polyurethane resins of the present invention may be carried out in the presence of an esterification catalyst, or combination of catalysts. Some catalysts in general use are derivatives of tin, such as for example, stannous oxalate, stannous octoate, dibutyl tin oxide, dibutyl tin dilaurate, stannous chloride and stannous fluoride. Combinations of tin catalysts and others may be employed as desired.

The esterification reaction is carried out in an inert atmosphere, i.e., in a nitrogen atmosphere which aids in the prevention of degradation and excessive color in the polyester.

As stated, the hydroxyl-terminated polyester used to react with the diisocyanate to form the polyurethane may be formed from combinations of the stated dicarboxylic acids. Thus, as the examples hereinafter demonstrate, it is possible to use combinations of adipic and azelaic acids, or adipic and 1,12-dodecanedioic acids, or azelaic and 1,12-dodecanedioic acids to achieve the desired properties in the resultant polyurethane product, provided the hydroxyl range limitations are observed.

Any magnetic pigment is operable in the present invention. These include magnetic iron oxide, magnetic cobalt-modified iron oxide, magnetic chromium dioxide, metallic iron, magnetic ferrites and combinations thereof.

The present invention also relates to an improved magnetic tape and to a process of preparing said tape, the improved tape comprising a flexible substrate, a magnetic pigment coating and a binder for bonding said coating onto said substrate, the improvement residing in the binder which comprises a thermoplastic polyurethane composition characterized by excellent mechanical and thermal properties, high hardness and the capability of binding or adhering to magnetic pigments, said composition being essentially free of cross-links and comprising the reaction product of:

(A) an hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having an hydroxyl number of from about 50 to about 250, (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di($\beta$-hydroxyethyl) ether, the resultant hydroxyl number of said polyester and chain extender together being from about 130 to about 300, and (C) an aliphatic or aromatic diisocyanate in an amount substantially equivalent to the molar quantity of (A) plus (B).

This invention also relates to an improved process for bonding a magnetic pigment to a flexible substrate to provide an adherent coating of magnetic pigment thereon, said process comprising admixing a magnetic pigment with a solvent solution of a binder, coating said solvent solution of binder onto a suitable flexible substrate and removing the solvent therefrom to form an adherent magnetic pigment coating on said substrate, wherein the improvement resides in the binder which is a thermoplastic polyurethane composition characterized by excellent mechanical and thermal properties, high hardness and the capability of binding or adhering to magnetic pigments said composition being essentially free of cross-links and comprising the reaction product of:

(A) an hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having an hydroxyl number of from about 50 to about 250, (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di($\beta$-hydroxyethyl) ether, the resultant hydroxyl number of said polyester and chain extender together being from about 130 to about 300, and (C) an aliphatic or aromatic diisocyanate in an amount substantially equivalent to the molar quantity of (A) plus (B).

Generally, magnetic tape manufacturers desire magnetic iron oxide loadings as high as possible to maximize magnetic performance. Too high an oxide loading may result in loss of film integrity which can be manifested by oxide shed. Oxide shed will result in signal dropouts, head and equipment fouling and poor tape wear properties.

In order to compare the magnetic pigment binding capacity of resin binders, tensile measurements are used to determine the film integrity, i.e., strength of films prepared at different magnetic oxide loadings using the various binders. As the pigment loading increases, the tensile strength of pigmented films decreases because of greater polymer film discontinuity. Binders which show less ability to form a continuous film while binding the oxide will exhibit lower tensile strength, and will lose all tensile strength at lower maximum pigment loading than more capable binders.

The polyurethane resins of the present invention also fulfill another important requirement of magnetic pigment binder for a magnetic tape, i.e., freedom from blocking without the necessity of incorporating a hardening resin or crosslinking agent.

For a complete understanding of the present invention, reference is now made to the following specific examples illustrating the polyurethane resins of this invention and their unique properties.

EXAMPLE 1

Procedure A—Preparation of Hydroxyl-Terminated Polyester

Into a suitable reactor equipped with sealed stirrer, nitrogen inlet and two connected reflux condensers, 1800 grams (12.5 moles) of molten (80°–90° C.) 1,4-cyclohexanedimethanol were added under constant stirring. To the stirred mass, 817.6 grams (5.6 moles) of adipic acid and 451.2 grams (2.4 moles) of azelaic acid were added together with a catalyst combination of 1.0 gram of stannous oxalate and 4.0 grams of phthalimide. Purging with nitrogen was begun. Steam was fed to the first condenser and cold water to the second one while raising the temperature of the mixture to about 225° C., while continuously removing water. The reaction was allowed to proceed at this temperature for about four hours, after which time the batch was allowed to cool to about 165° C., and the nitrogen supply was discontinued. A vacuum of less than 10 mm. mercury was drawn and the reaction was allowed to continue for five hours at 165° C. while removing the remaining water and low molecular weight polyester.

At the end of this time, the batch was cooled to about 100° C. The resultant hydroxyl-terminated polyester had an acid number of 0.5 and a hydroxyl number of 169.

Procedure B—Preparation of Polyurethane Resin

The polyester of Procedure A was blended with 1,4-butanediol (chain extender) in the ratio of 1435.4 grams of polyester and 164.6 grams of 1,4-butanediol to yield 1600 grams of a polyester-polyol blend having a hydroxyl number of 280 and composed of:
Polyester 89.7%
1,4-butanediol 10.3%

To this entire polyol blend there were added 1.5 grams of phenyl mercuric propionate catalyst and 997.6 grams of MDI. The ingredients were thoroughly mixed and then cured in an oven at 125° C. for one hour. The resulting polyurethane polymer had a viscosity of 1000 centipoises (cps) when measured as a 20% solution in tetrahydrofuran.

EXAMPLE 2

The procedure of Example 1 was followed with the following exceptions:

Procedure A—Preparation of Hydroxyl-Terminated Polyester

The quantity of 1,4-cyclohexanedimethanol used was 2304 grams (16.0 moles) to yield a polyester having an acid number of 0.3 and a hydroxyl number of 248.

Procedure B—Preparation of Polyurethane Resin

The polyester of Procedure A was blended with 1,4-butanediol in the ratio of 1516.8 grams of polyester and 83.2 grams of 1,4-butanediol to yield 1600 grams of a polyester-polyol blend having a hydroxyl number of 300 and composed of:
Polyester—94.8%
1,4-butanediol—5.2%

To this entire polyol blend there were added 1.5 grams of phenyl mercuric propionate catalyst and 1060.9 grams of MDI to give a resulting polyurethane polymer having a viscosity of 3300 cps.

EXAMPLE 3

The procedure of Example 1 was followed with the following exceptions:

Procedure A—Preparation of Hydroxyl-Terminated Polyester

The quantity of 1,4-cyclohexanedimethanol used was 1756.8 grams (12.2 moles), no adipic acid was used, and the quantity of azelaic acid was 1504.6 grams (8.0 moles) to yield a polyester having an acid number of 0.8 and a hydroxyl number of 154.

Procedure B—Preparation of Polyurethane Resin

The polyester of Procedure A was blended with 1,4-butanediol in the ratio of 1473.6 grams of polyester and 126.4 grams of 1,4-butanediol to 1600 grams of a polyester-polyol blend having an hydroxyl number of 240 and composed of:
Polyester—92.1%
1,4-butanediol—7.9%

To this entire polyol blend there were added 1.5 grams of phenyl mercuric propionate catalyst and 850 grams of MDI to give a resulting polyurethane polymer having a viscosity of 2550 cps.

EXAMPLE 4

The procedure of Example 3 was followed with the following exceptions:

Procedure A—Hydroxyl-Terminated Polyester

No azelaic acid was used. Instead, 1840 grams (8.0 moles) of 1,12-dodecandioic acid was used to yield a polyester having an hydroxyl number of 129.

Procedure B—Preparation of Polyurethane Resin

The polyester of Procedure A was blended with 1,4-butanediol in the ratio of 1485 grams of the polyester and 115 grams of 1,4-butanediol to yield 1600 grams of a polyester-polyol blend having an hydroxyl number of 210 and composed of:
Polyester—92.8%
1,4-butanediol—7.2%

To this entire polyol blend there were added 1.5 grams of P.M.P. catalyst, 743.3 grams of MDI to give a resulting polyurethane resin having a viscosity of 1200 cps.

EXAMPLE 5

The procedure of Example 4 was followed with the following exceptions:

Procedure A—Hydroxyl-Terminated Polyester

The quantity of 1,12 dodecanedioic acid was 552.0 grams (2.4 moles) and 817.6 grams (5.6 moles) of adipic acid was also added to yield a polyester having an acid number of 0.7 and a hydroxyl number of 162.

Procedure B—Preparation of Polyurethane Resin

The polyester of Procedure A was blended with 1,4-butanediol in the ratio of 1484.8 grams of the polyester and 115.2 grams of 1,4-butanediol to yield 1600 grams of a polyester-polyol having a hydroxyl number of 240 and composed of:
Polyester—92.8
1,4-butanediol—7.2

To this entire blend there were added 1.5 grams of phenyl mercuric propionate catalyst and 853.2 grams of MDI to give a resulting polyurethane resin having a viscosity of 1000 cps.

EXAMPLE 6

The procedure of Example 5 was followed except that the polyester was formed from 1800 grams (12.5 moles) of 1,4-cyclohexanedimenthanol, 920 grams (4.0 moles) of 1,12-dodecanedioic acid and 752.0 grams (4.0 moles) of azelaic acid to yield a polyester having an acid number of 0.9 and a hydroxyl number of 149.

This polyester was blended with 1,4-butanediol in the ratio of 1467.2 grams of polyester and 132.8 grams of 1,4-butanediol to yield 1600 grams of a polyester-polyol blend having a hydroxyl number of 240 and composed of:

Polyester—91.7%
1,4-butanediol—8.3%

To this entire polyol blend there were added 1.5 grams of phenyl mercuric propionate catalyst and 854.3 grams of MDI to give a resulting polyurethane resin having a viscosity of 1000 cps.

EXAMPLE 7

For convenience in manufacturing, the following two hydroxyl-terminated polyester masterbatches were prepared, each according to the procedure of Example 1, but formed from the indicated ingredients:

| Ingredients | Polyester Masterbatches | |
|---|---|---|
| | 7A | 7B |
| 1,4-cyclohexane-dimethanol | 1440 g. (10.0 moles) | 1584.0 g. (11.0 moles) |
| adipic acid | 817.6 g. (5.6 moles) | 817.6 g. (5.6 moles) |
| azelaic acid | 451.2 g. (2.4 moles) | 451.2 g. (2.4 moles) |
| catalyst (stannous oxalate) | 1.0 g. | 1.0 g. |
| catalyst (phthalimide) | 4.0 g. | 4.0 g. |
| acid number | 0.7 | 0.5 |
| hydroxyl number | 84 | 124 |

Polyester Masterbatches 7A and 7B were blended to a hydroxyl number of 93 and then admixed with 1,4-butanediol to yield a polyester-polyol blend having a hydroxyl value of 180, and a resultant composition as follows:

| | % by weight |
|---|---|
| Polyester Masterbatch 7A | 71.44 |
| Polyester Masterbatch 7B | 21.01 |
| 1,4-butanediol | 7.55 |

To 1600 grams of the above polyester-polyol blend there were added 1.5 grams of phenyl mercuric propionate catalyst and 644.2 grams of MDI according to the procedure of Example 1 to give a resulting polyurethane polymer having a viscosity of 3300 cps.

EXAMPLE 8

The procedure of Example 7 was followed except that Polyester Masterbatches 7A and 7B were blended to a hydroxyl number of 101 and then admixed with 1,4-butanediol to yield a polyester-polyol blend having a hydroxyl number of 200 and a resultant composition as follows:

| | % By Weight |
|---|---|
| Polyester Masterbatch 7A | 52.31 |
| Polyester Masterbatch 7B | 39.06 |
| 1,4-butanediol | 8.63 |

To 1600 grams of the above polyester-polyol blend there were added 1.5 grams of phenyl mercuric propionate catalyst and 714.9 grams of MDI according to the procedure of Example 1 to give a resulting polyurethane polymer resin having a viscosity of 1650 cps.

EXAMPLE 9

The procedure of Example 7 was followed except that Polyester Masterbatches 7B and 9C were used as follows:

| | Polyester Masterbatches | |
|---|---|---|
| | 7B | 9C |
| 1,4-cyclohexanedimethanol | 1584 g. (11.0 moles) | 1800 g. (12.5 moles) |
| adipic acid | 817.6 g. (5.6 moles) | 817.6 g (5.6 moles) |
| azelaic acid | 451.2 g. (2.4 moles) | 451.2 g. (2.4 moles) |
| catalyst (stannous oxalate) | 1.0 g. | 1.0 g. |
| catalyst (phthalimide) | 4.0 g. | 4.0 g. |
| acid number | 0.5 | 0.5 |
| hydroxyl number | 124 | 169 |

Polyester Masterbatches 7B and 9C were blended to a hydroxyl number of 136.8 and then admixed with 1,4-butanediol to yield a polyester-polyol blend having a hydroxyl number of 260 and a resultant composition as follows:

| | % By Wt. |
|---|---|
| Polyester Masterbatch 7B | 63.6 |
| Polyester Masterbatch 9C | 25.3 |
| 1,4-butanediol | 11.1 |

To 1600 grams of the polyester-polyol blend there were added 1.5 grams of phenyl mercuric propionate catalyst and 924.7 grams of MDI according to the procedure of Example 1 to give a resultant polyurethane polymer resin having a viscosity of 1500 cps.

EXAMPLE 10

The procedure of Example 7 was followed except that Polyester Masterbatch 9C and 10D were used as follows:

| | Polyester Masterbatches | |
|---|---|---|
| | 9C | 10D |
| 1,4-cyclohexanedimethanol | 1800 g. (12.5 moles) | 2304 g. (16.0 moles) |
| adipic acid | 817.6 g. (5.6 moles) | 817.6 g. (5.6 moles) |
| azelaic acid | 451.2 g. (2.4 moles) | 451.2 g. (2.4 moles) |
| catalyst (stannous oxalate) | 1.0 g. | 1.0 g. |
| catalyst (phthalimide) | 4.0 g. | 4.0 g. |
| acid number | 0.5 g. | 0.3 g. |
| hydroxyl number | 169 | 248 |

Polyester Masterbatches 9C and 10D were blended to a hydroxyl number of 220 with a resultant polyester-polyol blend composition of:

|  | % By Wt. |
|---|---|
| Polyester Masterbatch 9C | 35.75 |
| Polyester Masterbatch 10D | 64.25 |

To 1600 grams of the above polyester-polyol blend there were added 1.5 grams of phenyl mercuric propionate catalyst and 766.1 grams of MDI according to the procedure of Example 1 to give a resultant polyurethane polymer resin having a viscosity of 3400 cps.

Evaluation of Polyurethane Resins

Each of the polyurethane resins of Examples 1–10 were evaluated with respect to hardness, magnetic oxide loading capacity and tensile strength of films made from polyurethane-oxide combinations, and blocking characteristics.

Hardness—The hardness of the polyurethane resins of Examples 1–10 were determined in accordance with ASTM Method D-2240-75 using a "D" type durometer. A hardness value of about 50 is considered adequate for this type of product. The following Table I sets forth the hardness values determined for the indicated polyurethane resins of Examples 1–10.

TABLE I

| Example | Hardness |
|---|---|
| 1 | 76 |
| 2 | 78 |
| 3 | 76 |
| 4 | 65 |
| 5 | 70 |
| 6 | 70 |
| 7 | 65 |
| 8 | 70 |
| 9 | 76 |
| 10 | 75 |

The foregoing results attest to the excellent hardness of the polyurethane resins of the present invention.

Tensile Testing of Pigmented Films Having Oxide:Resin Ratios of 3:1 and 7.5:1 Respectively

Preparation of Oxide-Resin Dispersions

A magnetic iron-oxide-polyurethane resins dispersion was prepared by charging the following into a suitable ball mill equipped with steel balls:
 magnetic iron oxide
 solvent (or solvents)
 wetting agent
 lubricant
The mill was sealed and allowed to grind (rotate) for a period of 24 hours, after which time the mill was opened and a polyurethane resin of the present invention was added as a 20% solution in a suitable solvent (tetrahydrofuran). The quantity of oxide and polyurethane resin may be varied to provide oxide:resin ratios varying from 3:1 to 7.5:1, as desired.

The thus loaded mill was then sealed and allowed to grind for an additional 24 hours.

The following two formulations were used to prepare oxide-polyurethane dispersions of each of the polyurethane resins of Examples 1–10, having oxide resin ratios of 3:1 and 7.5:1 respectively:

| Oxide:Binder = 3:1 | Wt. (grams) | |
|---|---|---|
| Magnetic iron oxide | 150 | |
| Tetrahydrofuran | 96 | Stage I |
| Toluene | 64 | Grind Cycle - |
| Wetting Agent | 4.0 | 24 hrs. |
| Lubricant | 1.0 | |
| Polyurethane Resin | 50 | Stage II |
|  | → 250 | |
| THF | 200 | Thindown - 20-24 hrs. |

| Oxide:Binder = 7.5:1 | Wt. (grams) | |
|---|---|---|
| Magnetic iron oxide | 150 | |
| Tetrahydrofuran | 96 | Stage I |
| Toluene | 64 | Grind Cycle - |
| Wetting Agent | 4.0 | 24 hrs. |
| Lubricant | 1.0 | |
| Polyurethane Resin | 20 | Stage II |
|  | → 100 | |
| THF | 80 | Thindown - 20-24 hrs. |

Each finished dispersion was then filtered and coated onto a suitable release paper, using a laboratory coater having fixed gaps of 10, 15 and 20 mils respectively. After the solvents were volatilized, the dried samples were placed in a desiccator for 24 hours. Test samples were cut from the coated release paper, and the coatings were separated from the release paper and used for tensile strength measurements.

Tensile strength measurements were carried out in a room with a controlled temperature and humidity (60°-67° F., 15-20% RH) on an Instron tensile tester. The rate of jaw separation was two inches/minute and the gap between jaws was set at 1.25 inches. The jaw faces were covered with several layers of adhesive tape to prevent any sharp edges from damaging the samples.

The forces (in pounds) were recorded on a strip chart recorder adjusted to a chart speed of two inches per minute. The percent elongation and other tensile properties were determined from the chart.

Generally, a minimum of twenty replicates were tested except in those instances where low sample strength or a great number of defects prevent this number of samples from being obtained.

Tensile strength was calculated using the following formula:

$$\text{Tensile Strength (psi)} = \frac{\text{Force (lbs.)}}{[\text{sample thickness (in)}] (\text{sample width})}$$

Low values which are obviously not congruent with the majority of values are discarded. In most cases at least 16 values are averaged.

The results obtained by testing each polyurethane resin of Examples 1–10 are set forth in Table II.

TABLE II

| | Tensile Strength (psi) | |
|---|---|---|
| Example | Oxide/Resin 3:1 By Wt. | Oxide/Resin 7.5:1 By Wt. |
| 1 | 2000 | 1000 |
| 2 | 2400 | 1500 |
| 3 | 3100 | 1700 |
| 4 | 4300 | 1500 |
| 5 | 3500 | 900 |
| 6 | 4900 | 1700 |
| 7 | 3500 | 1100 |
| 8 | 3700 | 1100 |
| 9 | 4600 | 1400 |

TABLE II-continued

| | Tensile Strength (psi) | |
|---|---|---|
| Example | Oxide/Resin 3:1 By Wt. | Oxide/Resin 7.5:1 By Wt. |
| 10 | 3000 | 1800 |

The foregoing results demonstrate that even at the unusually high oxide loading of 7.5 oxide:1 resin there is excellent film integrity, as evidenced by the high tensile strength values.

BLOCKING

Blocking tests provide a method of measuring layer to layer adhesion.

Blocking could conceivably occur during processing such as when unslit magnetic tape is wound into jumbo rolls, or it may occur in the finished products, such as in cassettes or reels of tape. Higher than normal heat and/or humidity will promote blocking.

Polyurethane-oxide dispersions of an oxide:resin ratio of 4:1 of each of the polyurethane resins of Examples 1-10 were prepared as described in "Preparation of Oxide-Resin Dispersions." Each of these dispersions was coated onto polyester film to provide a magnetic oxide-coated film.

In addition, a set of dispersions was prepared by incorporating therein 5% by weight of a cross-linking agent (the trimethylolpropane adduct of toluene diisocyanate) and preparing coated polyester film therefrom. This cross-linked polyurethane served as a standard with which to compare the performance of the cross-linked polyurethane resins, since it is well established in the art that the incorporation of a cross-linking agent in the preparation of a polyurethane resin lessens the blocking tendency of polyurethane coated film formed therefrom.

The following different test conditions were used in the blocking tests:

| | TEMPERATURE | HUMIDITY |
|---|---|---|
| (1) | 150° F. | Dry |
| (2) | 185° F. | Dry |

The samples used for testing were strips of tape ¼" wide by approximately 50" long. A short adhesive tape was used to attach one end of the sample to a glass spindle 20 cm long by 1.6 cm in diameter. Appropriate weights were added to the free end of the tape to provide the necessary tension. The tape was wound upon itself, and when fully wound up to the weight, the tape was held in place, the weight was removed, and the free end was secured with another adhesive tab. At no time was the tension lost.

Although the sample preparation was similar for all three conditions, the loading weights, or tension, differ from the dry and humid tests.

The samples which were to be conditioned were wound with a load of 600 g.

The 150° F. and 185° F. dry samples were maintained at temperature for the full 20 hours. After 20 hours, all samples were removed from the ovens, and allowed to cool to room temperature.

When cool, the samples were unwound and graded from 1 to 7 according to their degree of blocking.

The grading system is explained below.

When The Adhesive Tab Is Removed:

1. The tape springs off or will fall freely when the spindle is held in a vertical position.
2. The tape will not fall freely in a vertical position but will unwind easily with no trace of layer to layer adhesion when the spindle is rotated while horizontal.
3. Tape unwinds under its own weight when the horizontal spindle is rotated, but slight layer to layer adhesion will cause it to cling slightly along the curvature of the spindle.
4. The tape does not unwind by itself when the horizontal spindle is rotated, but only a negligible force will be required to unwind it.
5. A noticeable force is required to remove the tape.
6. Slight delamination occurs in spots as tape is unwound.
7. Severe delamination occurs during unwinding. As seen from the foregoing, gradings of 5-7 are unacceptable for commercial production, whereas a grading of "4" is marginally acceptable.

TABLE III

| | Blocking Characteristics | |
|---|---|---|
| Example | 185° F. Dry-Uncrosslinked | 150° Dry-Uncrosslinked |
| 1 | 1 | 1 |
| 2 | 1 | 1 |
| 3 | 1 | 1 |
| 4 | 2 | 1 |
| 5 | 4 | 1 |
| 6 | 1 | 1 |
| 7 | 1 | 1 |
| 8 | 1 | 1 |
| 9 | 1 | 1 |
| 10 | 1 | 1 |

The foregoing results show that the polyurethane resins of the present invention, without the use of a crosslinking agent, are capable of binding magnetic iron oxide to film to provide coatings which are essentially free from blocking.

MECHANICAL PROPERTIES

The mechanical properties, i.e., tensile strength, of films cast from each of the polyurethane resins of Examples 1-10 were determined in accordance with the following procedure:

SAMPLE PREPARATION

A. A 25% solids solution in dimethyl formamide was prepared with the polyurethane of each Example. This was then coated onto a suitable release paper at a wet thickness of 15 mils using a drawdown bar.

B. This coating was then put into a forced air oven at 60° C. The temperature was raised to 100° C. and left for one hour.

C. The dried sample was then put into a desiccator for 24 hours, afterwhich the coating was inspected and all imperfections marked.

D. Using a die, test samples were cut from the coating, being sure to avoid any imperfections (air bubbles, dirt particles, etc.).

TEST PROCEDURE

An Instron tensile tester was used to measure tensile strength of the specimen coatings, the conditions of test being the same as those set forth for the Tensile Testing of Pigmented Films. The test was continued until the sample broke. The results are set forth in Table IV.

TABLE IV

| Example | Yield (psi) | Force (psi) at 100% E* | Force (psi) at 200% E* | Force (psi) at 300% E* | Ultimate Strength (psi) | Ultimate Elongation (%) |
|---|---|---|---|---|---|---|
| 1 | 7600 | 6000 | 7500 | — | 8400 | 250 |
| 2 | 8400 | 6700 | — | — | 9000 | 190 |
| 3 | 6900 | 5300 | 6700 | — | 9300 | 290 |
| 4 | 4600 | 3200 | 5000 | 7650 | 8100 | 320 |
| 5 | 4200 | 3250 | 5350 | 8100 | 8500 | 315 |
| 6 | 5500 | 4300 | 5100 | — | 7000 | 285 |
| 7 | 3840 | 2900 | 4800 | 7800 | 8700 | 330 |
| 8 | 5000 | 3400 | 5250 | 8000 | 8850 | 330 |
| 9 | 7300 | 5600 | 6900 | — | 8600 | 275 |
| 10 | 7100 | 5900 | 7800 | — | 9500 | 250 |

*Elongation

What is claimed is:

1. A thermoplastic polyurethane composition characterized by excellent mechanical and thermal properties, high hardness and the capability of binding or adhering to magnetic pigments, said composition being essentially free of cross-links and comprising the reaction product of:
   (A) an hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having an hydroxyl number of from about 50 to about 250,
   (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di($\beta$-hydroxyethyl) ether, the resultant hydroxyl number of said polyester and chain extender together being from about 130 to about 300, and
   (C) an aliphatic or aromatic diisocyanate in an amount substantially equivalent to the molar quantity of (A) plus (B).

2. The composition of claim 1 wherein the magnetic pigment is magnetic iron oxide, the dicarboxylic acid is adipic acid, the chain extender is 1,4-butanediol and the diisocyanate is methylene bis diphenyl diisocyanate.

3. The composition of claim 1 wherein the magnetic pigment is magnetic iron oxide, the dicarboxylic acid is azelaic acid, the polyester hydroxyl number range is from about 50 to about 235, the chain extender is 1,4-butanediol and the diisocyanate is methylene bis diphenyl diisocyanate.

4. The composition of claim 1 wherein the magnetic pigment is magnetic iron oxide, the dicarboxylic acid consists of a mixture of adipic and azelaic acids, the chain extender is 1,4-butanediol and the diisocyanate is methylene bis diphenyl diisocyanate.

5. The composition of claim 1 wherein the magnetic pigment is magnetic iron oxide, the dicarboxylic acid consists of a mixture of adipic and 1,12-dodecanedioic acids, the chain extender is 1,4-butanediol and the diisocyanate is methylene bis diphenyl diisocyanate.

6. The composition of claim 1 wherein the magnetic pigment is magnetic iron oxide, the dicarboxylic acid consists of a mixture of azelaic and 1,12-dodecanedioic acids, the polyester hydroxyl number range is from about 50 to about 235, the chain extender is 1,4-butanediol and the diiosocyanate is methylene bis diphenyl diisocyanate.

7. A thermoplastic polyurethane composition characterized by excellent mechanical and thermal properties, high hardness and the capability of binding or adhering to magnetic pigments, said composition being essentially free of cross-links and comprising the reaction product of:
   (A) a hydroxyl-terminated polyester which is the reaction product of 1,4-cyclohexanedimethanol and adipic acid, said polyester having a hydroxyl number of from about 50 to about 250,
   (B) 1,4-butanediol, the resultant hydroxyl number of said polyester and 1,4-butanediol being from about 130 to about 300, and
   (C) methylene bis diphenyl diisocyanate in an amount substantially equivalent to the molar quantity of (A) plus (B).

8. A thermoplastic polyurethane composition characterized by excellent mechanical and thermal properties, high hardness and the capability of binding or adhering to magnetic pigments, said composition being essentially free of crosslinks and comprising the reaction product of:
   (A) a hydroxyl-terminated polyester which is the reaction product of 1,4-cyclohexanedimethanol and azelaic acid, said polyester having a hydroxyl number of from about 50 to about 235,
   (B) 1,4-butanediol, the resultant hydroxyl number of said polyester and 1,4-butanediol being from about 130 to about 300, and
   (C) methylene bis diphenyl diisocyanate in an amount substantially equivalent to the molar quantity of (A) plus (B).

9. A thermoplastic polyurethane composition characterized by excellent mechanical and thermal properties, high hardness and the capability of binding or adhering to magnetic pigments, said composition being essentially free of cross-links and comprising the reaction product of:
   (A) a hydroxyl-terminated polyester which is the reaction product of 1,4-cyclohexanedimethanol and 1,12-dodecanedioic acid, said polyester having a hydroxyl number of from about 50 to about 216,
   (B) 1,4-butanediol, the resultant hydroxyl number of said polyester and 1,4-butanediol being from about 130 to about 300, and
   (C) methylene bis diphenyl diisocyanate in an amount substantially equivalent to the molar quantity of (A) plus (B).

10. A thermoplastic polyurethane composition characterized by excellent mechanical and thermal properties, high hardness and the capability of binding or adhering to magnetic pigments, said composition being essentially free of cross-links and comprising the reaction product of:
    (A) a hydroxyl-terminated polyester which is the reaction product of 1,4-cyclohexanedimethanol and a mixture of adipic and azelaic acids, said polyester having a hydroxyl number of from about 50 to about 250,
    (B) 1,4-butanediol, the resultant hydroxyl number of said polyester and 1,4-butanediol being from about 130 to about 300, and
    (C) methylene bis diphenyl diisocyanate in an amount substantially equivalent to the molar quantity of (A) plus (B).

11. A thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and a mixture of adipic and 1,12-dodecanedioic acids, said polyester having a hydroxyl number of from about 50 to about 250,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

12. A thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and a mixture of azelaic and 1,12-dodecanedioic acids, said polyester having a hydroxyl number of from about 50 to about 235,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

13. In a magnetic tape comprising a flexible substrate, a magnetic pigment coating and a binder for bonding said coating onto said substrate, the improvement wherein said binder comprises a thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having an hydroxyl number of from about 50 to about 250,
  (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di(β-hydroxyethyl) ether, the resultant hydroxyl number of said polyester and chain extender together being from about 130 to about 300, and
  (C) an aliphatic or aromatic diisocyanate in an amount substantially equivalent to the molar quantity of (A) plus (B).

14. The magnetic tape of claim 13 wherein said binder comprises a thermoplastic polyurethane composition characterized by excellent mechanical and thermal properties, high hardness and the capability of binding or adhering to magnetic pigments, said composition being essentially free of crosslinks and comprising the reaction product of:
  (A) a hydroxyl-terminated polyester which is the reaction product of 1,4-cyclohexanedimethanol and adipic acid, said polyester having a hydroxyl number of from about 50 to about 250,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

15. The magnetic tape of claim 13 wherein the binder comprises a thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and azelaic acid, said polyester having a hydroxyl number of from about 50 to about 235,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

16. The magnetic tape of claim 13 wherein the binder comprises a thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and 1,12-dodecanedioic acid, said polyester having a hydroxyl number of from about 50 to about 216,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

17. The magnetic tape of claim 13 wherein the binder comprises a thermoplastic polyurethane composition characterized by excellent mechanical and thermal properties, high hardness and the capability of binding or adhering to magnetic pigments, said composition being essentially free of cross-links and comprising the reaction product of:
  (A) a hydroxyl-terminated polyester which is the reaction product of 1,4-cyclohexanedimethanol and a mixture of adipic and azelaic acids, said polyester having a hydroxyl number of from about 50 to about 250,
  (B) 1,4-butanediol, the resultant hydroxyl number of said polyester and 1,4-butanediol being from about 130 to about 300, and
  (C) methylene bis diphenyl diisocyanate in an amount substantially equivalent to the molar quantity of (A) plus (B).

18. The magnetic tape of claim 13 wherein the binder comprises a thermoplastic polyurethane composition characterized by excellent mechanical and thermal properties, high hardness and the capability of binding or adhering to magnetic pigments, said composition being essentially free of cross-links and comprising the reaction product of:

(A) a hydroxyl-terminated polyester which is the reaction product of 1,4-cyclohexanedimethanol and a mixture of adipic and 1,12-dodecanedioic acids, said polyester having hydroxyl number of from about 50 to about 250, (B) 1,4-butanediol, the resultant hydroxyl number of said polyester and 1,4-butanediol being from about 130 to about 300, and (C) methylene bis diphenyl diisocyanate in an amount substantially equivalent to the molar quantity of (A) plus (B).

19. The magnetic tape of claim 13 wherein the binder comprises a thermoplastic polyurethane composition characterized by excellent mechanical and thermal properties, high hardness and the capability of binding or adhering to magnetic pigments, said composition being essentially free of cross-links and comprising the reaction product of:

(A) a hydroxyl-terminated polyester which is the reaction product of 1,4-cyclohexanedimethanol and a mixture of azelaic and 1,12-dodecanedioic acids, said polyester having a hydroxyl number of from about 50 to about 235, (B) 1,4-butanediol, the resultant hydroxyl number of said polyester and 1,4-butanediol being from about 130 to about 300, and (C) methylene bis diphenyl diisocyanate in an amount substantially equivalent to the molar quantity of (A) plus (B).

20. In a process for bonding a magnetic pigment to a flexible substrate to provide an adherent coating of a magnetic pigment thereon, said process comprising admixing a magnetic pigment with a solvent solution of a binder, coating said solvent solution of binder onto a suitable flexible substrate and removing the solvent therefrom to form an adherent magnetic pigment coating on said substrate, the improvement wherein the binder is a thermoplastic polyurethane composition characterized by excellent mechanical and thermal properties, high hardness and the capability of binding or adhering to a magnetic pigment, said composition being essentially free of cross-links and comprising the reaction product of:

(A) a hydroxyl-terminated polyester which is the reaction product of 1,4-cyclohexanedimethanol and a dicarboxylic acid selected from the group consisting of adipic acid, azelaic acid and 1,12-dodecanedioic acid or mixtures thereof, said polyester having a hydroxyl number of from about 50 to about 250, (B) a chain extender selected from the group consisting of ethylene glycol, propylene glycol, 1,4-butanediol, 1,3-butanediol, 1,5-pentanediol, 1,6-hexanediol, 1,4-cyclohexanedimethanol and hydroquinone di($\beta$-hydroxyethyl) ether, the resultant hydroxyl number of said polyester and chain extender together being from about 130 to about 300, and (C) an aliphatic or aromatic diisocyanate in an amount substantially equivalent to the molar quantity of (A) plus (B).

21. The process of claim 20 wherein the dicarboxylic acid is adipic and the chain extender is 1,4-butanediol and the diisocyanate is methylene bis diphenyl diisocyanate.

22. The process of claim 20 wherein the dicarboxylic acid is azelaic acid, the polyester hydroxyl number range is from about 50 to about 235, the chain extender is 1,4-butanediol and the diisocyanate is methylene bis diphenyl diisocyanate.

23. The process of claim 20 wherein the dicarboxylic acid is 1,12-dodecanedioic acid, the polyester hydroxyl number range is from about 50 to about 216, the chain extender is 1,4-butanediol and the diisocyanate is methylene bis diphenyl diisocyanate.

24. The process of claim 20 wherein the dicarboxylic acid consists of a mixture of adipic acid and azelaic acid, the chain extender is 1,4-butanediol and the diisocyanate is methylene bis diphenyl diisocyanate.

25. The process of claim 20 wherein the dicarboxylic acid consists of a mixture of adipic acid and 1,12-dodecanedioic acid, the chain extender is 1,4-butanediol and the diisocyanate is methylene bis diphenyl diisocyanate.

26. The process of claim 20 wherein the dicarboxylic acid consists of a mixture of azelaic acid and 1,12-dodecanedioic acid, the polyester hydroxyl number range is from about 50 to about 235, and the chain extender is 1,4-butanediol and the diisocyanate is methylene bis diphenyl diisocyanate.

* * * * *